United States Patent
Walker et al.

(10) Patent No.: US 6,186,893 B1
(45) Date of Patent: *Feb. 13, 2001

(54) SLOT MACHINE ADVERTISING/SALES SYSTEM AND METHOD

(75) Inventors: Jay S. Walker, Ridgefield; James A. Jorasch, Stamford; Thomas M. Sparico, Riverside, all of CT (US)

(73) Assignee: Walker Digital, LLC, Stamford, CT (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/769,085

(22) Filed: Dec. 18, 1996

(51) Int. Cl.[7] .................................................. A63F 9/22
(52) U.S. Cl. .............................. 463/20; 463/25; 463/16; 273/143 R; 705/26; 705/16
(58) Field of Search ............................. 463/1, 25, 29–31, 463/17–20, 40–42; 455/6.3, 5.2, 5.1; 348/1, 12–13; 273/139, 138.2, 143 R; 364/412.1, 410.1; 705/14, 16–18, 26–27, 35, 39; 700/91, 93

(56) References Cited

U.S. PATENT DOCUMENTS

| | | | |
|---|---|---|---|
| 4,745,468 | * 5/1988 | Von Kohorn | 463/40 |
| 4,876,592 | * 10/1989 | Von Kohorn | 434/323 |
| 5,022,172 | 6/1991 | Kawahara et al. | |
| 5,083,271 | * 1/1992 | Thacher et al. | 463/29 |
| 5,259,613 | 11/1993 | Marnell, II | |
| 5,283,734 | * 2/1994 | Von Kohorn | 463/17 |
| 5,429,361 | * 7/1995 | Raven et al. | 463/29 |
| 5,470,079 | * 11/1995 | LeStrange et al. | 463/29 |
| 5,488,411 | 1/1996 | Lewis | 455/6.3 |
| 5,697,844 | * 12/1997 | Von Kohorn | 463/40 |
| 5,759,101 | * 6/1998 | Von Kohorn | 463/40 |

OTHER PUBLICATIONS

Poe, Juanita "Promoters Confident TV Viewers Eager To Cry 'Bingo'",pg. 1, Chicago Tribune, May 7, 1992.

Turcsik, Richard "Recycling–Slot Machine is Tested At A&P Unit", vol. 42, No. 51, p. 17, Supermarket News, Dec. 21, 1992.

Rich, Laura, "All Aboard The Brand Train", Inside Media, p. 26, Mar. 29, 1995.

"DCI Telecommunications Inc. Announces Merger Discussion", PR Newswire, Mar. 15, 1996.

(List continued on next page.)

Primary Examiner—Mark A Sager
(74) Attorney, Agent, or Firm—Kurt M. Maschoff; Dean Alderucci (57) ABSTRACT

A network server provides control functions for gambling devices of the type which provide intermittent monetary payments to players at a point-of-play. The point-of-play includes an interactive display device for displaying messages to the player and for receiving player responses which are then transmitted to a network server. Memory at the network server stores product and product purchase information and customer profile data. The network server causes transmission of product and product purchase information to the interactive display device and monitors each of the gambling devices to detect an occurrence of a player win that requires a monetary payout. The network server is responsive to the detection of the player win and to an entry from the player which indicates the purchase of a product (as offered by a locally displayed advertisement), to credit the purchase price of the product against the anticipated monetary payout. The network server is also controlled to display selected subsets of product and product purchase information in accord with player characteristic data that is input by the player at the gambling device.

163 Claims, 7 Drawing Sheets

OTHER PUBLICATIONS

Hilzenrath, David S., "Change Is Good, They Bet; Cybercash Has The Product. Now If Only Nickel–And–Dime Transactions Would Take Off . . . " The Washington Post, p. F01, Oct. 21, 1996.

Gillen, Marilyn A. "Ads Begin To Pop Up In CD–ROMS, Games; Ads Begin In Video & Games and CD–ROM", Billboard, Mar. 25, 1995 pp. 58.

"Australian Interactive Television Could Include Gambling On Demand", Computergram International, May 2, 1996.

* cited by examiner

| MERCHANDISE ID NUMBER | PRICE | PRODUCT DESCRIPTION | QUANTITY REMAINING |
|---|---|---|---|
| | | | |
| | | | |
| | | | |

FIG. 4

| ADVERTISEMENT ID NUMBER | AUDIO / VIDEO OF ADVERTISEMENT | SLOT MACHINE CRITERIA | NUMBER OF TIMES DISPLAYED | NUMBER OF PURCHASES |
|---|---|---|---|---|
| | | | | |
| | | | | |
| | | | | |

SLOT MACHINE ADVERTISING/SALES SYSTEM AND METHOD

FIELD OF THE INVENTION

This invention relates to an apparatus which provides interactive marketing and user response facilities for gaming machines and, more particularly, to a system which selectively provides advertising and purchase information to a user in accordance with predetermined criteria such as player identification data and/or a gaming payoff amount.

BACKGROUND OF THE INVENTION

Slot machines provide an important source of income for the gaming industry. For that reason, gaming establishments constantly search for marketing strategies to appeal to slot machine players and to distinguish their slot machines from competitive installations. U.S. Pat. No. 5,259,613, entitled "Casino and Entertainment System", describes a slot machine installation wherein gaming devices are provided with audio/video communication equipment that is connected to a central control station. The control station selectively engages in both voice and video communication with the players at each individual slot machine. Various promotions can be offered to the players through the video and audio communication facilities and live sporting events and even daytime soap opera television can be displayed.

It is well known that advertisers integrate advertising messages into video games. For instance, the billboards in some car-racing games are paid advertisements, in much the same manner as advertisers pay to have their messages displayed on billboards at a real race track.

Direct response advertising is well known and widely practiced. A direct response advertisement aims to elicit an order or inquiry upon the message being shown to a potential consumer. The response mechanism is often the return of a physical order coupon or the placing of a toll-free call to the direct response advertiser. Direct response advertising is now being attempted through electronic networks where the consumer can respond, electronically, from a computer terminal.

U.S. Pat. No. 5,488,411 entitled "Interactive System for a Closed Cable Network" provides an example of a prior art direct response advertising system. There, a closed cable network is described which includes means for transmitting and receiving telephone messages. As an example, the network is installed in a hotel and provides hotel guests with facilities for catalog shopping. Media information is fed to the guest's room via a television monitor. The guest can then select from a number of shopping sources by interacting with a catalog order desk which then bills the guest's room directly. The billing can occur through the hotel's account computer or can be charged to a credit card transaction. A receipt is then printed at the front desk of the hotel and the goods are delivered either to the hotel or the home address of the guest.

Modern slot machines are often networked, via a local area network, and are centrally controlled from a server (i.e., a computer operating under control of server software/firmware). Such a system is capable of handling any kind of digital information, both from the server to the individual slot machines and vice-versa. Since a slot machine has a coin acceptor, it is capable of receiving payment, measuring the amount of payment received and communicating such amount to the server. Many of the more modern slot machines display video reels instead of the well known mechanical reels. For slot-style gaming devices, such as video poker, and video blackjack, the card faces are all video.

There is a continuing desire on the part of gaming establishments to increase the services that are provided to players at each gaming device. Further, there is a desire to provide such services, based upon intelligent conclusions regarding characteristics of the player and a matching thereof to offered products and services.

Accordingly, it is an object of this invention to provide a gaming system wherein advertising can be provided to slot-style gaming devices and which allows a player to respond to and benefit from such advertising messages.

It is a further object of this invention to provide a system for provision of advertising/product/pricing information to slot machine players, wherein the information is intelligently chosen based upon conditions at the slot machine and characteristics of the player.

SUMMARY OF THE INVENTION

A network server provides control functions for gambling devices of the type which provide intermittent monetary payments to players at a point-of-play. The point-of-play includes an interactive display device for displaying messages to the player and for receiving player responses which are then transmitted to a network server. Memory at the network server stores product and product purchase information as well as customer profile data. The network server causes transmission of product and product purchase information to the interactive display device and monitors each of the gambling devices to detect an occurrence of a player win that requires a monetary payout. The network server is responsive to the detection of the player win, to an entry from the player which indicates the purchase of a product (as offered by a locally displayed advertisement), and to pay out the amount of the win less the purchase price of the product. The network server is also controlled to display selected subsets of product and product purchase information in accord with player characteristic data that is input by the player at the gambling device.

DETAILED DESCRIPTION OF THE INVENTION

Figure 1:
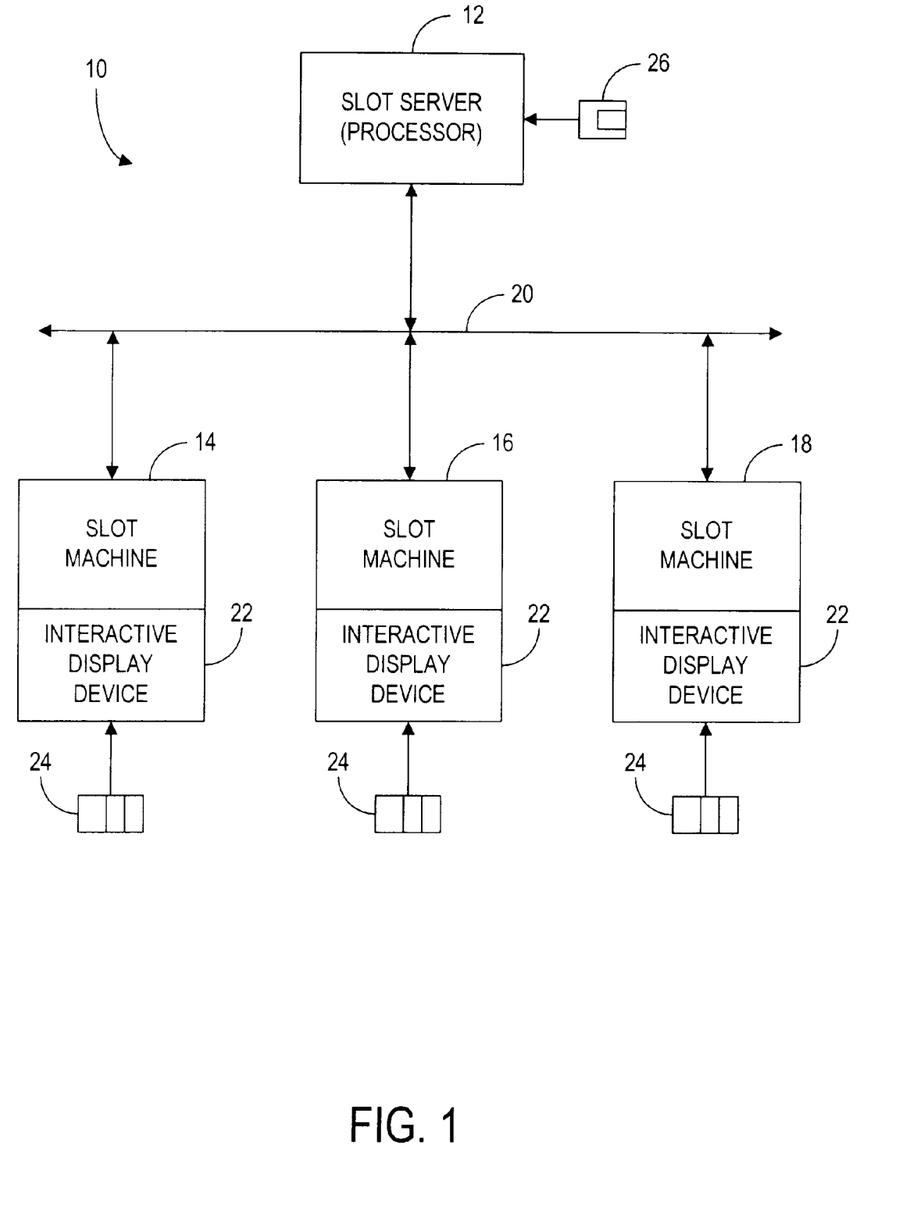
FIG. 1 is a block diagram of a network with a network server that cooperates with a plurality of slot machines to provide selected services thereto.

Referring to FIG. 1, a network 10 includes a network server 12 which is connected to a plurality of slot machines 14, 16, 18 and, via a bus system 20. Each of slot machines 14, 16, and 18 includes an interactive display device 22 which is adapted to display messages that are either downloaded from network server 12 or are generated locally in the respective slot machine. The slot machines may alternatively be connected to server 12 through an appropriate wireless network.

Note that while only slot machines are indicated in FIG. 1 as being connected to bus system 20, other gaming devices which provide intermittent payouts to a player in response to continued play actions can also be controlled by network server 12 in the same manner as the slot machines (e.g., keno, bingo, poker, . . . etc.). Thus, while the description hereafter will consider slot machines, it is to be understood that other types of gaming devices are also to be considered within the scope of the invention.

Each interactive display device 22 is provided with means for receiving a player-identity card 24 that typically includes player information, e.g., identity of the player, and may also include further data such as an amount of a line of credit available to the player, an amount of remaining credit available, and player status information (i.e., frequent player, infrequent player, heavy bettor,). Each interactive display device 22 further includes key entry inputs (either soft or hard keys) that are made available for use by the player.

Network server 12 includes a transaction processor subroutine which is stored therein or which can be loaded thereinto via a magnetic disk 26. The transaction processor subroutine, in combination with the network server hardware, provides accounting and statistical services for connected slot machines, control and updating of connected databases, and provision of product and product purchase information to the slot machines. The transaction processor subroutine further processes input signals from the players at the respective slot machines.

Figure 2:
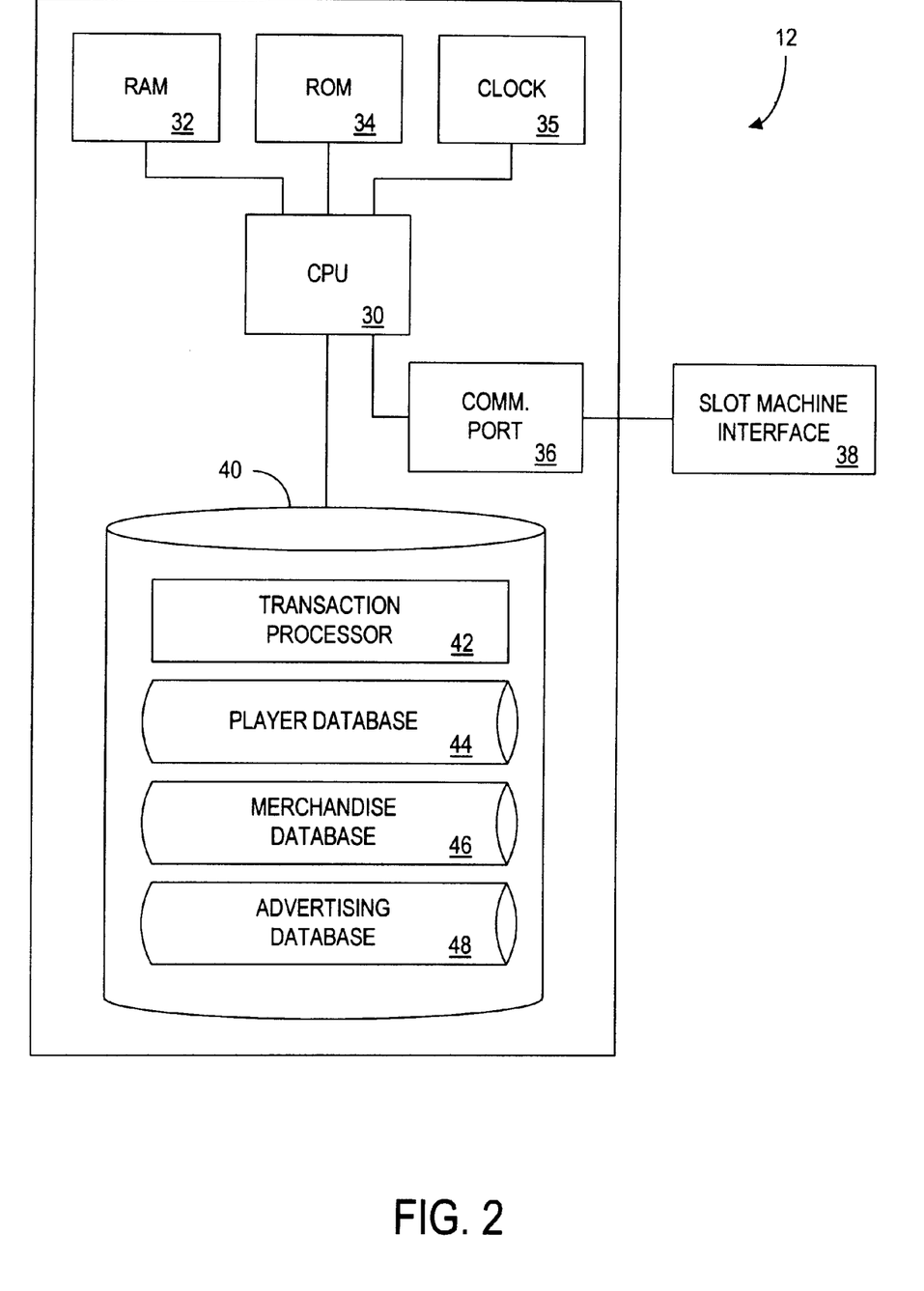
FIG. 2 is a high level block diagram of a network server which implements the invention hereof.

FIG. 2 illustrates a block diagram of a representative network server 12. Network server 12 includes a central processor unit (CPU) 30 which is coupled to a random access memory (RAM) 32, a read only memory (ROM) 34, a clock 35, and a communication port 36 which provides interconnection to bus system 20 (via slot machine interface 38). A data storage device 40 provides memory capacity for a transaction processor subroutine 42, a player database 44, a product database 46 and an advertising database 48. Note that while transaction processor subroutine 42 is indicated as a software driven process, it can also be performed by a dedicated microprocessor, to enhance system performance.

Figure 3:
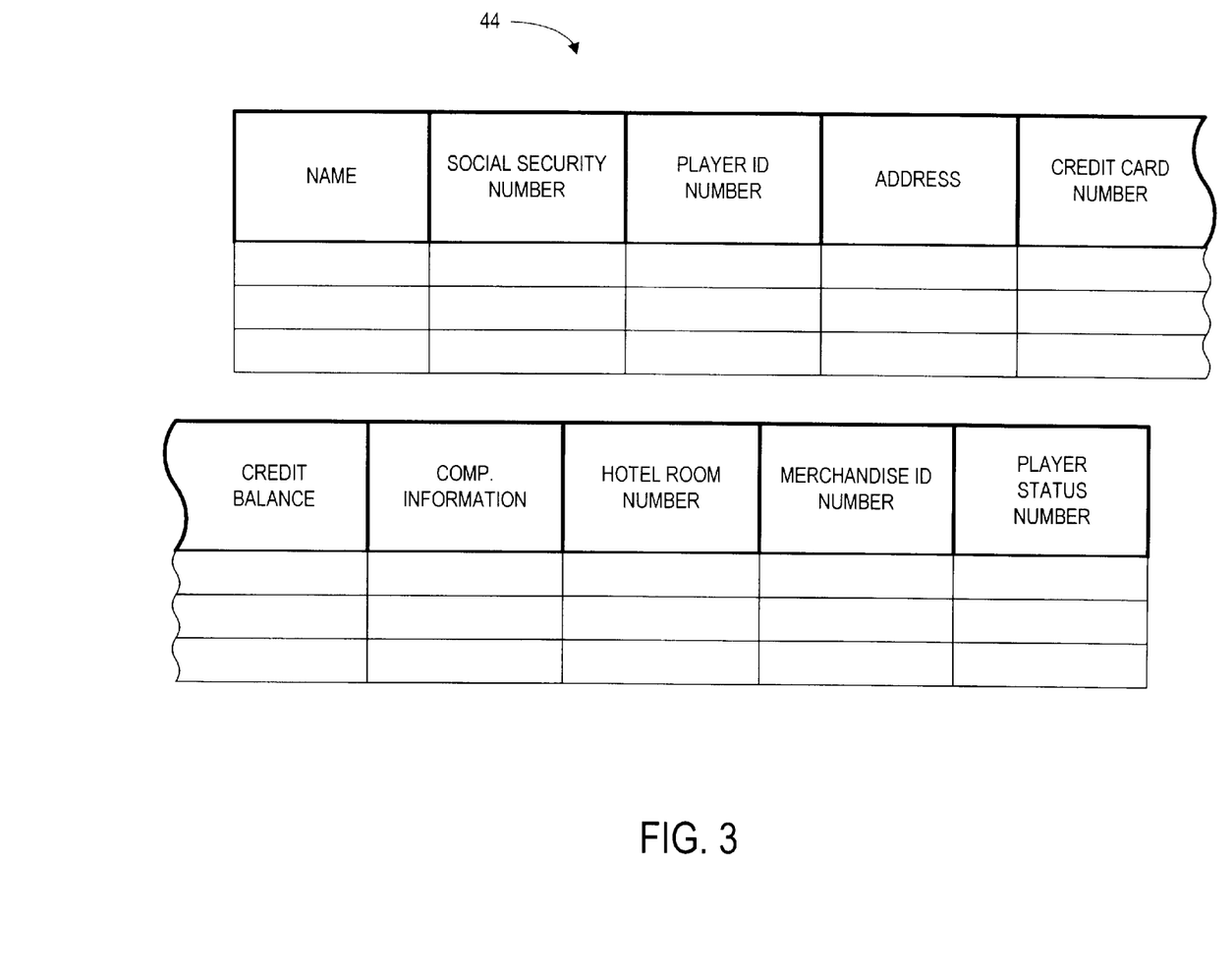
FIG. 3 is a schematic diagram of a player database maintained in the network server of FIG. 2.

The operation of transaction processor subroutine 42 will be described in detail below in conjunction with the flow diagrams of FIGS. 7 and 8. A schematic showing of the contents of player database 44 is found in FIG. 3 and preferably includes the following data:

Name;

Social Security Number;

Player identification (ID) number;

Address;

Credit card number;

Credit balance;

Complimentary information;

Hotel room number;

Product ID number; and

Player status number.

Most of the contents of player database 44 are self-explanatory and require no further description. The complimentary information is coded information indicating which services are to be provided to the player, free of charge or at a discount. The product ID number identifies each product which the player has purchased, in a manner to be described below. Finally, the player status number is a value assigned to the player and indicates a status level assigned by the gaming establishment to the player. For instance, the player may be a frequent player and entitled to certain premiums. Further, the player may have been disqualified from further play and this will be indicated by an assigned status number.

In essence, player database 44 provides sufficient information to enable network server 12 to perform the invention hereof without requiring any further data from the player, other than a selection or non-selection of an offered product, service or offering.

Figure 4:
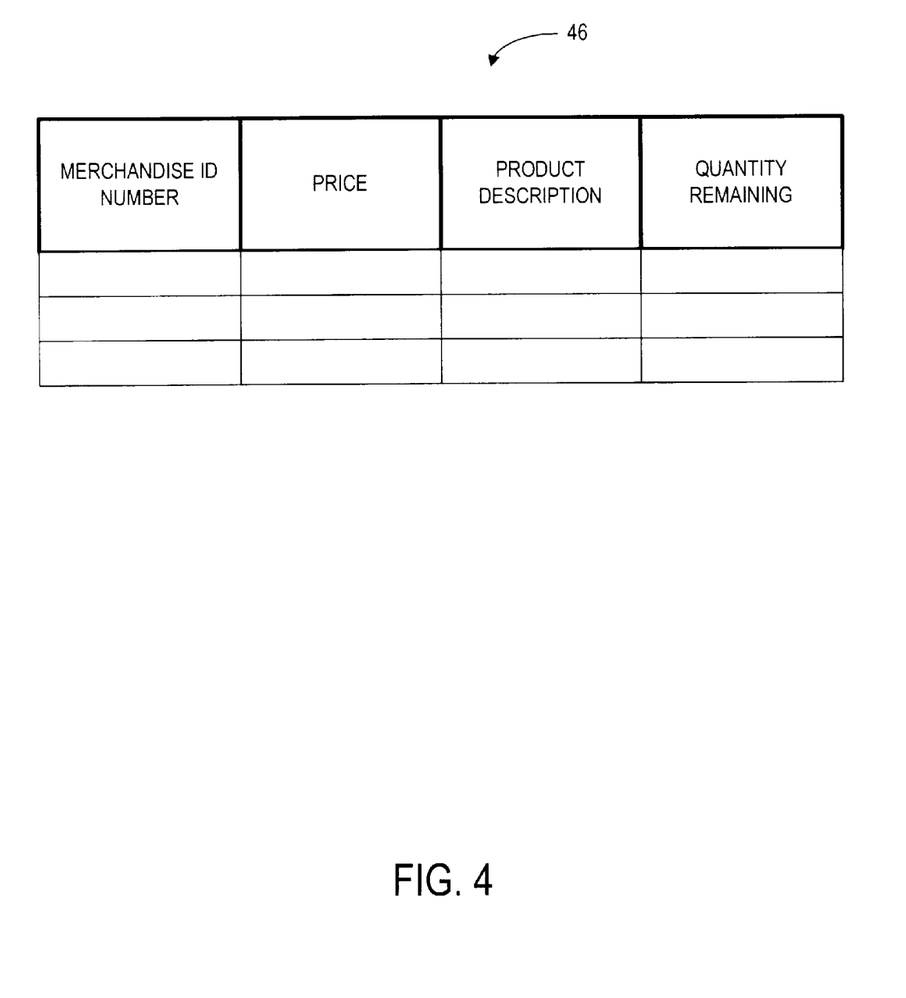
FIG. 4 is a schematic diagram of a product database maintained in the network server of FIG. 2.

Product database 46 is illustrated, schematically, in FIG. 4 and includes a product ID number; the price of the product; a brief product description; and the quantity of the product remaining. In addition to merchandise, database 46 may include services that are to be offered to players, (e.g. tax advice, medical and legal consulting). Further, for example, an offering may be included that will compensate the player for: switching phone services (e.g. AT&T to MCI): cable TV providers; from one credit card to another; taking out a loan from a specified institution; agreeing to attend a seminar.

The term "product" will be used herein to refer to all such offerings, i.e., merchandise-type products, services and other offerings.

Figure 5:
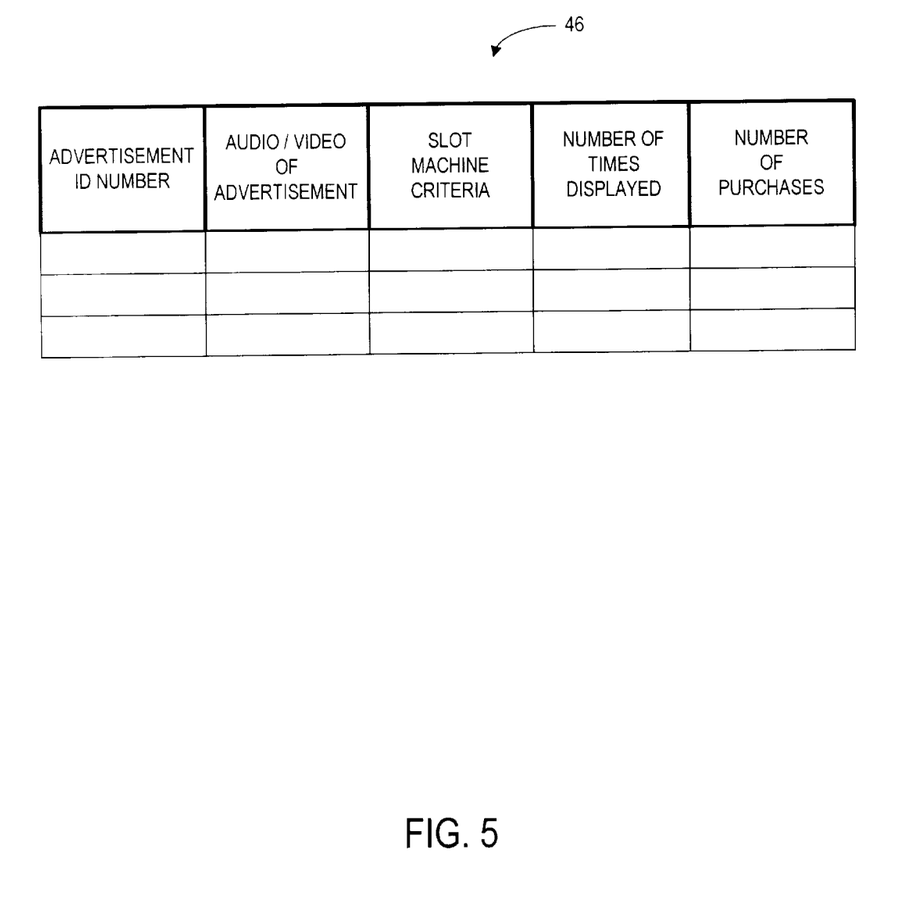
FIG. 5 is a schematic diagram of an advertising database maintained in the network server of FIG. 1.

Advertising database 48 is shown in FIG. 5 and includes an advertisement ID number; an audio/video presentation of the advertisement; a slot machine criteria code; number-of-times displayed indicator; and a number-of-purchases entry column.

The slot machine criteria entry in advertising database 48 is a code which identifies which set or subset of slot machines are to receive an advertisement. More specifically, certain advertisements will only be shown to slot machines which require, for example, a dollar or more for each play. Further, certain advertisements may only be shown to machines which are playable for less than a dollar per play. The number-of-times displayed and number-of-purchases entries in advertising database 48 are used for later analysis of the effectiveness of the advertisement.

While the audio/video presentation of the advertisement is shown as being contained within advertising database 48, a value inserted into database 48 may also be a pointer to a further on-line video or audio player that is responsive to the pointer and other control data to provide a desired presentation.

Figure 6:
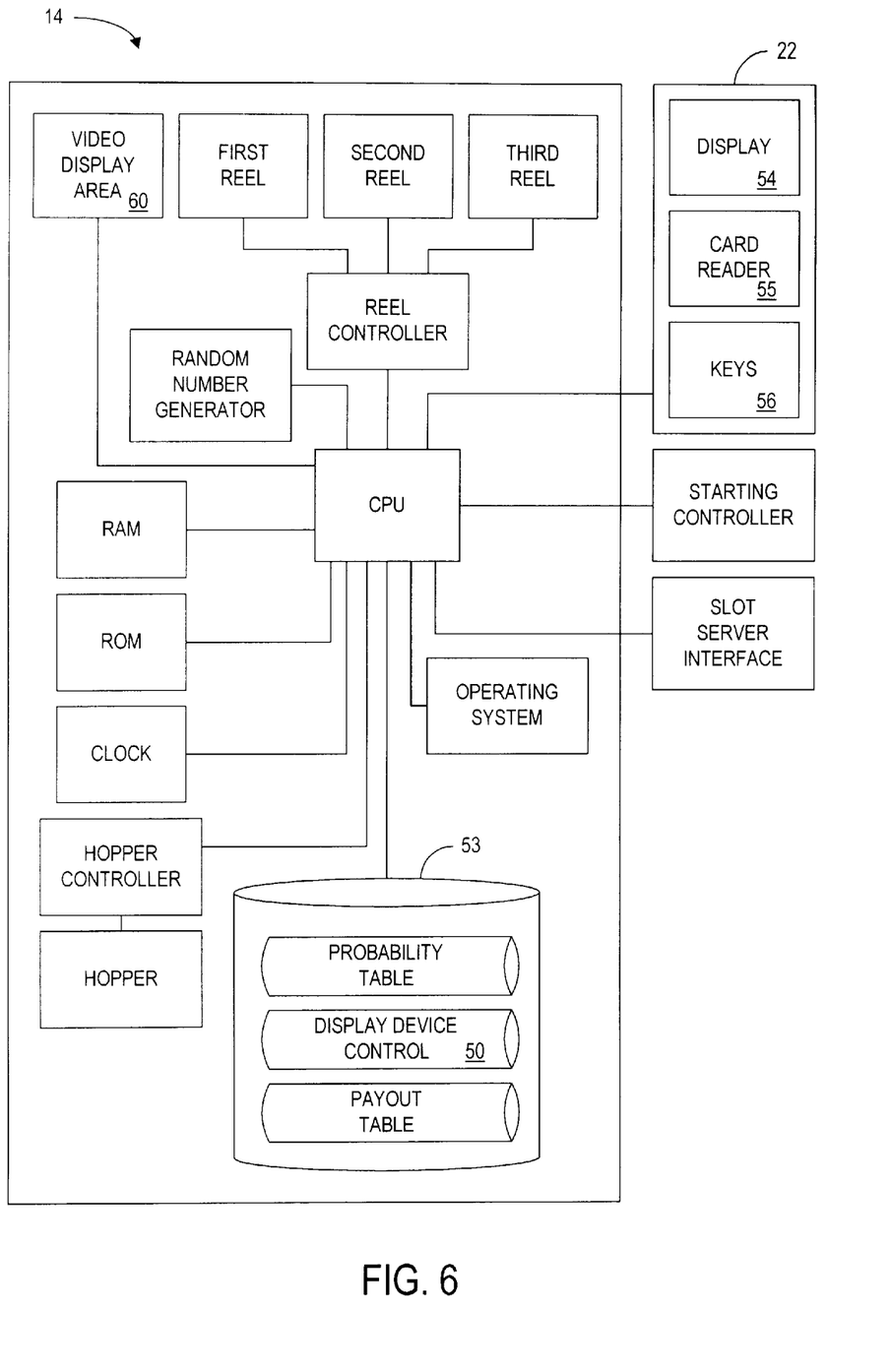
FIG. 6 is a high level block diagram of a slot machine employed in the network of FIG. 1.

Turning now to FIG. 6, a block diagram of a slot machine 14 is illustrated. Slot machine 14 is configured in a manner known in the prior art, except for the inclusion of an interactive display 22 and a display control procedure 50 contained within a resident data storage device 53. Interactive display device 22 includes a display 54, a card reader 55 and keys 56 ("soft" or "hard") for enabling a player to input data into slot machine 14. A video display area 60 may also be present in slot machine 14, but may not be accessible to external control by network server 12. If this is the case, display 54 is used to display downloaded product/product purchase information and further messages to the player. Otherwise, the provision of display 54 may not be necessary. Each of the remaining submodules within slot machine 14 is known to those skilled in the art and requires no detailed discussion.

Display control procedure 50 is called into action when a product/product purchase advertising message is received from network server 12 to enable display of the message by display 54. Further, display control procedure 50 controls the operation of interactive display device 22, including card reader 55 and keys 56. When a player inputs a selection or other data via keys 56, such an entry is recognized by display control procedure 50, which causes the resident CPU in slot machine 14 to configure the entered data for transmission over bus system 20 (via the slot/network server interface) to network server 12.

Figure 7:
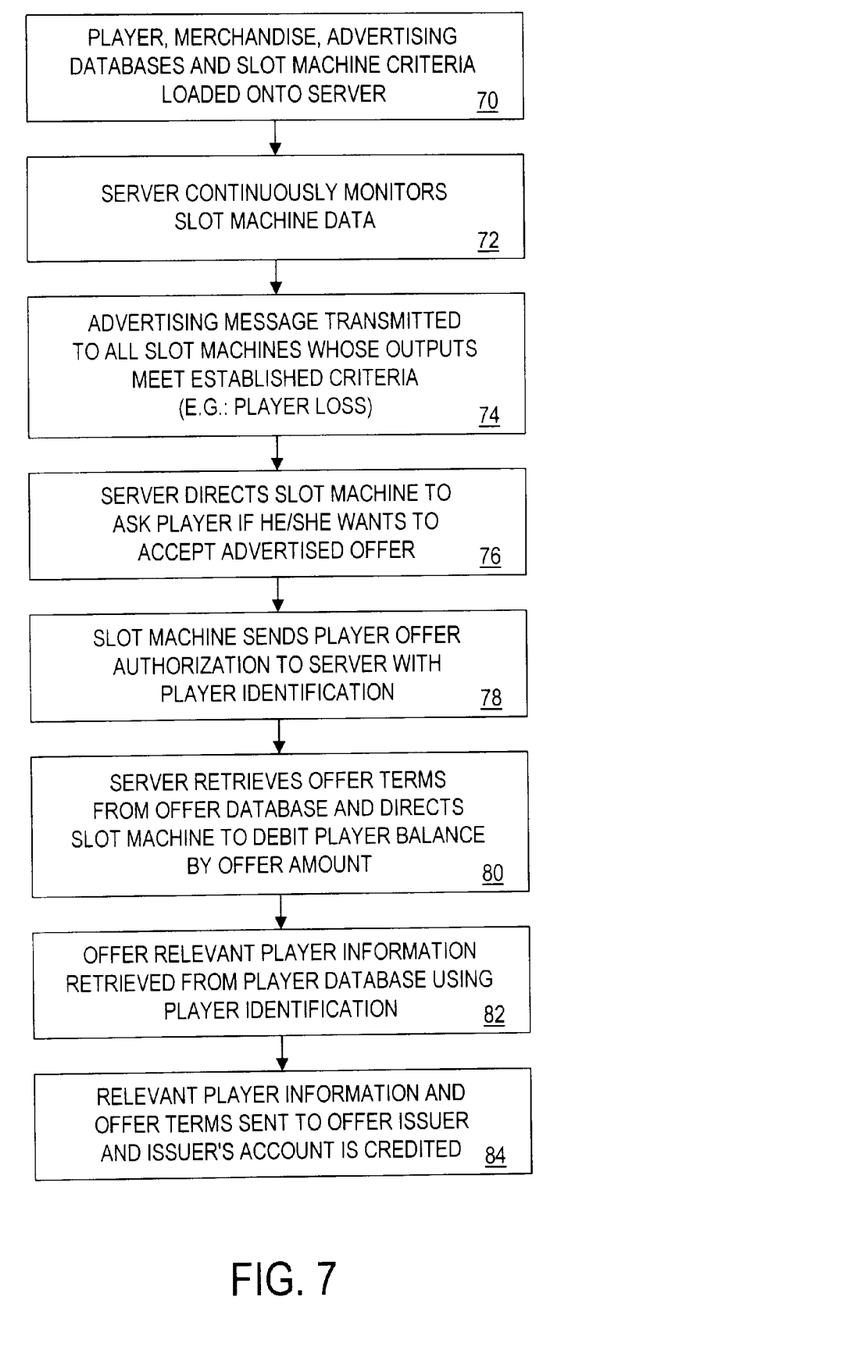
FIG. 7 illustrates a logic flow diagram of the operation of the invention.

Turning now to FIG. 7, the operation of the invention will be described. Initially, network server 12 has had loaded and stored therein player database 44, product database 46, advertising database 48 and slot machine criteria(box 70). Such stored databases and resident transaction processor routine 42 (FIG. 2) enable network server 12 to selectively provide advertising messages to individual slot machines 14, 16, and 18.

Thereafter, network server 12 monitors and analyzes data that is fed from the connected slot machines (box 72). In response to the received slot machine data, network server 12 transmits product advertisement/pricing data to all slot machines whose output data meets established criteria (box 74). For instance, a certain product advertisement may be provided to all slot machines which require one dollar or more per play. Further, any slot machine which has been continuously played by a player for a predetermined period of time can be supplied with a subset of advertisements. Similarly, advertisements of certain price level products/services can be targeted to a player in accordance with the player's assigned status number. Such status number is input to the slot machine by insertion of the user's card into the card reader at the start of play.

In any event, an advertisement is transmitted to any slot machine which indicates to network server 12 that a player win has occurred which requires a monetary payout to the player. At such time, network server 12 will send a message to the respective slot machine which asks if the player wishes to purchase advertised goods for a displayed price (box 76). Such a message will appear on display 54 within interactive display module 22.

If the player sends a purchase confirmation to network server 12 (box 78), it is also preferably accompanied by a player ID number which is stored both locally in slot machine 22 and in network server 12. This will enable a confirming message to be transmitted to display 54 indicating the name of the purchaser, for confirmation purposes.

Thereafter, network server 12 retrieves the price of the product from product database 46 and directs slot machine 14 to pay out the amount of the win, less the purchase price of the product. If the purchase price is greater than the amount of the payout, the player's credit balance is debited by the amount of the purchase. Further, the credit balance maintained by network server 12 is likewise debited (box 80). Thereafter, the player address is retrieved from player database 44, based upon the player ID number (box 82). The player address and purchase information are then sent to a dispatching function where the goods are shipped to the player and network server 12 then credits the manufacturer's account with a payment amount (box 84).

The latter action assumes that the manufacturer's account is maintained locally. The system may also be configured to initiate a transfer of funds to the manufacturer's account in a banking establishment via a wire transfer.

If the player sends a purchase confirmation to network server 12 evidencing acceptance of a product "switch" offer (e.g., from one telephone supplier to another), server 12 retrieves the amount to be credited to the player, credits the player's account and so notifies the slot machine. If the account is also maintained at the slot machine, it too is credited. The credited amount may be tagged so that it is only useful for play of the slot machine, or it can actually be paid out, to be later billed to the player if the player reneges.

While not shown in FIG. 7, further control features can be implemented under control of transaction processor routine 42. For instance, the player, by agreeing to have an advertisement shown at his/her slot machine, can be targeted to enjoy incremental benefits such as higher payouts, or free slot pulls. Transaction processor routine 42 can also enable players to disable the advertising message, should they so desire. Further, a corporate sponsor can arrange for extra prizes to be available to be awarded to players with certain pre-specified status numbers (e.g., employees) in the player database.

Finally, the product to be advertised at the time of a monetary payout can be chosen in conformance with the amount of the payout so as to enable the amount of the payout to at least cover the cost of the purchase.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for controlling a gaming device, comprising the steps of:

detecting a player win that requires an amount of monetary payout;

displaying an offer for a product to a player in response to the player win;

receiving an acceptance of the offer from the player; and adjusting a monetary balance associated with the player in response to the acceptance, wherein the step of adjusting increases the monetary balance.

2. A method for controlling a gaming device, comprising the steps of:

detecting a player win that requires an amount of monetary payout;

displaying an offer for a product to a player in response to the player win;

receiving an acceptance of the offer from the player;

outputting the amount of the win, less the purchase price of the product, to the player; and displaying a confirming message to the player.

3. The method of claim 2, wherein the displayed offer includes an associated purchase price of the product.

4. The method of claim 3, further comprising:

crediting a manufacturer's account with a payment amount based on the purchase price upon receiving the acceptance of the offer from the player.

5. The method of claim 3, further comprising:

initiating a transfer of funds to a manufacturer's account, wherein an amount of the funds transferred is based on the purchase price.

6. The method of claim 3, further comprising:

determining that the purchase price of the product is greater than the amount of monetary payout; and adjusting a monetary balance associated with the player by a difference between the purchase price and the amount of monetary payout.

7. The method of claims 3, wherein the displayed offer is selected so that the purchase price associated with the displayed offer is not greater than the amount of monetary payout.

8. The method of claim 2, wherein the displayed offer is selected based on the amount of monetary payout.

9. The method of claim 2, wherein the confirming message includes a name of the player.

10. The method of claim 2, further including the step of receiving a purchase confirmation from the player.

11. The method of claim 2, further comprising:

sending purchase information to a dispatching function.

12. The method of claim 11, wherein the step of sending purchase information to a dispatching function comprises:

sending an address associated with the player and purchase information to a dispatching function for shipping the product to the player.

13. The method of claim 2, further comprising:

selecting the offer based on a code associated with the gaming device.

14. The method of claim 13, wherein the offer is a first offer if the code is a first predetermined code and is a second offer if the code is a second predetermined code.

15. The method of claim 14, wherein the code identifies a denomination requirement of the gaming device.

16. The method of claim 15, wherein the offer is a first offer if the code identifies a first denomination requirement and is a second offer if the code identifies a second denomination requirement.

17. The method of claim 2, wherein the displayed offer is selected based on player characteristic data associated with the player.

18. The method of claim 17, wherein the player characteristic data includes a player status number.

19. The method of claim 18, wherein the player status number is input to the gaming device by insertion of the player's card into a card reader of the gaming device.

20. The method of claim 18, wherein the player status number identifies a frequent player.

21. The method of claim 2, further comprising:

storing in memory the displayed offer.

22. The method of claim 21, further comprising:

storing in memory the acceptance.

23. The method of claim 2, wherein the step of displaying an offer comprises:

displaying an offer for a product based on whether output data of a gaming device meets established criteria.

24. The method of claim 23, wherein the step of displaying an offer comprises:

displaying a predetermined offer if the gaming device has been continuously played by the player for a predetermined amount of time.

25. The method of claim 2, further comprising:

determining whether the player has agreed to accept displayed offers for products.

26. The method of claim 25, wherein the step of determining comprises:

determining that a player has disabled a product offer function at the gaming device.

27. The method of claim 25, further comprising:

providing a benefit to the player if the player has agreed to accept offers.

28. The method of claim 27, wherein the benefit comprises higher payouts.

29. The method of claim 27, wherein the benefit comprises free games at the gaming device.

30. The method of claim 29, wherein the gaming device comprises a slot machine and the benefit comprises free slot pulls.

31. A method for controlling a gaming device, comprising the steps of:

detecting a player win that requires an amount of monetary payout;

displaying an offer to a player, and an associated amount that will be credited to a monetary balance associated with the player upon acceptance of the offer, in response to the player win;

receiving a player acceptance of the offer; and crediting the associated amount to the balance.

32. The method of claim 31, further comprising:

receiving an offer acceptance confirmation from the player.

33. The method of claim 31, further comprising:

displaying a confirming message to the player.

34. The method of claim 31, wherein the confirming message includes a name of the player.

35. The method of claim 31, wherein the displayed offer is selected based on the amount of monetary payout.

36. The method of claim 31, further comprising:

debiting a manufacturer's account by the associated amount upon receiving the player acceptance of the offer.

37. The method of claim 31, further comprising:

selecting the offer based on a code associated with a gaming device.

38. The method of claim 37, wherein the offer is a first offer if the code is a first predetermined code and is a second offer if the code is a second predetermined code.

39. The method of claim 37, wherein the code identifies a denomination requirement of the gaming device.

40. The method of claim 39, wherein the offer is a first offer if the code identifies a first denomination requirement and is a second offer if the code identifies a second denomination requirement.

41. The method of claim 31, wherein the displayed offer is selected based on player characteristic data associated with the player.

42. The method of claim 41, wherein the player characteristic data includes a player status number.

43. The method of claim 42, wherein the player status number is input to a gaming device by insertion of the player's card into a card reader of the gaming device.

44. The method of claim 42, wherein the player status number identifies a frequent player.

45. The method of claim 31, further comprising:

storing in memory the displayed offer.

46. The method of claim 45, further comprising:

storing in memory the acceptance.

47. The method of claim 31, wherein the step of displaying an offer comprises:

displaying an offer for a product based on whether output data of a gaming device meets established criteria.

48. The method of claim 47, wherein the step of displaying an offer comprises:

displaying a predetermined offer if the gaming device has been continuously played by the player for a predetermined amount of time.

49. The method of claim 31, further comprising:

billing the associated amount to the player if the player reneges on the acceptance of the offer.

50. A method for controlling a gaming device, comprising the steps of:

detecting a player win that requires an amount of monetary payout;

determining an offer for an amount of additional monetary payout in exchange for a player's agreement to switch service providers, based on player characteristic data and a code associated with the gaming device at which the win was detected;

displaying the offer to the player, including the amount of additional monetary payout to the player;

receiving an acceptance of the offer from the player;

storing the acceptance of the offer; and crediting the amount of additional monetary payout to a monetary balance associated with the player.

51. An apparatus for controlling a gaming device, comprising:

a processor, and a storage device that stores a program for directing the processor;

the processor being operative with the program to:

detect a player win that requires an amount of monetary payout;

display an offer for a product to a player in response to the player win;

receive an acceptance of the offer from the player; and adjust a monetary balance associated with the player in response to the acceptance.

52. The apparatus of claim 51, wherein the processor is further operative to:

decrease the monetary balance by a purchase price of the product.

53. The apparatus of claim 51, wherein the processor is further operative to:

increase the monetary balance.

54. An apparatus for controlling a gaming device, comprising:

a processor, and a storage device that stores a program for directing the processor;

the processor being operative with the program to:

detect a player win that requires an amount of monetary payout;

display an offer for a product and an associated purchase price of the product to a player in response to the player win;

receive an acceptance of the offer from the player; and output the amount of the win, less the purchase price of the product, to the player.

55. The apparatus of claim 54, wherein the processor is further operative to:

display an offer that includes an associated purchase price.

56. The apparatus of claim 55, wherein the processor is farther operative to:

credit a manufacturer's account with a payment amount based on the purchase price upon receiving the acceptance of the offer from the player.

57. The apparatus of claim 55, wherein the processor is further operative to:

initiate a transfer of funds to a manufacturer's account, wherein an amount of funds transferred is based on the purchase price.

58. The apparatus of claim 55, wherein the processor is further operative to:

determine that the purchase price of the product is greater than the amount of monetary payout; and adjust a monetary balance associated with the player by a difference between the purchase price and the amount of monetary payout.

59. The apparatus of claim 55, wherein the displayed offer is selected so that the purchase price associated with the displayed offer is not greater than the amount of monetary payout.

60. The apparatus of claim 54, wherein the displayed offer is selected based on the amount of monetary payout.

61. The apparatus of claim 54, wherein the processor is further operative to:

receive a purchase confirmation from the player.

62. The apparatus of claim 54, wherein the processor is further operative to:

display a confirming message to the player.

63. The apparatus of claim 62, wherein the confirming message includes a name of the player.

64. The apparatus of claim 54, wherein the processor is further operative to:

send purchase information to a dispatching function.

65. The apparatus of claim 64, wherein the processor being operative to send purchase information comprises the processor being operative to:

send an address associated with the player and purchase information to a dispatching function for shipping the product to the player.

66. The apparatus of claim 54, wherein the processor is further operative to:

select the offer based on a code associated with the gaming device.

67. The apparatus of claim 66, wherein the offer is a first offer if the code is a first predetermined code and is a second offer if the code is a second predetermined code.

68. The apparatus of claim 66, wherein the code identifies a denomination requirement of the gaming device.

69. The apparatus of claim 68, wherein the offer is a first offer if the code identifies a first denomination requirement and is a second offer if the code identifies a second denomination requirement.

70. The apparatus of claim 54, wherein the displayed offer is selected based on player characteristic data associated with the player.

71. The apparatus of claim 70, wherein the player characteristic data includes a player status number.

72. The apparatus of claim 71, wherein the player status number is input to the gaming device by insertion of the player's card into a card reader of the gaming device.

73. The apparatus of claim 72, wherein the player status number identifies a frequent player.

74. The apparatus of claim 54, wherein the processor is further operative to:

store in memory the displayed offer.

75. The apparatus of claim 74, wherein the processor is further operative to:

store in memory the acceptance.

76. The apparatus of claim 54, wherein the processor being operative to display an offer comprises the processor being operative to:

display an offer for a product based on whether output data of a gaming device meets established criteria.

77. The apparatus of claim 76, wherein displaying an offer comprises:

displaying a predetermined offer if the gaming device has been continuously played by the player for a predetermined amount of time.

78. The apparatus of claim 54, wherein the processor is further operative to:

determine whether the player has agreed to accept displayed offers for products.

79. The apparatus of claim 78, wherein the processor is operative to:

determine that a player has disabled a product offer function at the gaming device.

80. The apparatus of claim 79, wherein the processor is further operative to:

provide a benefit to the player if the player has agreed to accept offers.

81. The apparatus of claim 80, wherein the benefit comprises higher payouts.

82. The apparatus of claim 80, wherein the benefit comprises free games at the gaming device.

83. The apparatus of claim 82, wherein the gaming device comprises a slot machine and the benefit comprises free slot pulls.

84. An apparatus for controlling a gaming device, comprising:

a processor, and a storage device that stores a program for directing the processor; the processor being operative with the program to:

detect a player win that requires an amount of monetary payout;

display an offer to a player, and an associated amount that will be credited to a monetary balance associated with the player, upon acceptance of the offer in response to the player win;

receive a player acceptance of the offer; and credit the balance by the associated amount.

85. The apparatus of claim 84, wherein the processor is further operative to:

receive an offer acceptance confirmation from the player.

86. The apparatus of claim 84, wherein the processor is further operative to:

display a confirming message to the player.

87. The apparatus of claim 84, wherein the confirming message includes a name of the player.

88. The apparatus of claim 84, wherein the processor is further operative to:

debit a manufacturer's account by the associated amount upon receiving the player acceptance of the offer.

89. The apparatus of claim 84, wherein the processor is further operative to:

select the offer based on a code associated with the gaming device.

90. The apparatus of claim 89, wherein the offer is a first offer if the code is a first predetermined code and is a second offer if the code is a second predetermined code.

91. The apparatus of claim 89, wherein the code identifies a denomination requirement of the gaming device.

92. The apparatus of claim 91, wherein the offer is a first offer if the code identifies a first denomination requirement and is a second offer if the code identifies a second denomination requirement.

93. The apparatus of claim 84, wherein the processor selects the displayed offer based on player characteristic data associated with the player.

94. The apparatus of claim 93, wherein the player characteristic data includes a player status number.

95. The apparatus of claim 94, wherein the player status number is input to a gaming device by insertion of the player's card into a card reader of the gaming device.

96. The apparatus of claim 94, wherein the player status number identifies a frequent player.

97. The apparatus of claim 84, wherein the processor selects the offer based on the amount of monetary payout.

98. The apparatus of claim 84, wherein the processor is further operative to:

store in memory the displayed offer.

99. The apparatus of claim 84, wherein the processor is further operative to:

store in memory the acceptance.

100. The apparatus of claim 84, when the processor being operative to display an offer comprises the processor being operative to display an offer for a product based on whether output data of a gaming device meets established criteria.

101. The apparatus of claim 100, wherein the processor being operative to display an offer comprises the processor being operative to display a predetermined offer if the gaming device has been continuously played by the player for a predetermined amount of time.

102. The apparatus of claim 84, wherein the processor is further operative to:

bill the associated amount to the player if the player reneges on the acceptance of the offer.

103. An apparatus for controlling a gaming device, comprising:

a processor, and a storage device that stores a program for directing the processor; the processor being operative with the program to:

detect a player win that requires an amount of monetary payout;

determine an offer for a product to display to a player associated with the monetary payout, based on player characteristic data and a code associated with the gaming device, wherein a purchase price associated with the offer is not greater than the amount of monetary payout;

display the offer to the player;

receive an acceptance of the offer from the player, thereby receiving an indication of a purchase;

send an indication of the purchase to a dispatching function; and output the amount of the win, less the purchase price of the product, to the player.

104. An apparatus for controlling a gaming device, comprising:

a processor, and a storage device that stores a program for directing the processor; the processor being operative with the program to:

detect a player win that requires an amount of monetary payout;

determine an offer for an amount of additional monetary payout in exchange for a player's agreement to switch service providers, based on player characteristic data and a code associated with the gaming device at which the win was detected;

display the offer to the player, including the amount of additional monetary payout to the player;

receive an acceptance of the offer from the player;

store the acceptance of the offer; and credit the amount of additional monetary payout to a monetary balance associated with the player.

105. A computer readable medium encoded with instructions for directing a processor to:

detect a player win that requires an amount of monetary win;

display an offer for a product to a player in response to the player win;

receive an acceptance of the offer from the player; and adjust a credit balance associated with the player in response to the acceptance.

106. The computer readable medium of claim 105, further encoded with instructions to:
  decrease the monetary balance by a purchase price of the product.

107. The computer readable medium of claim 105, further encoded with instructions to:
  increase the monetary balance.

108. A computer readable medium encoded with instructions for directing a processor to:
  detect a player win that requires an amount of monetary payout;
  display an offer for a product and an associated purchase price of the product to a player in response to the player win;
  receive an acceptance of the offer from the player; and
  output the amount of the win, less the purchase price of the product, to the player.

109. The computer readable medium of claim 108, wherein the displayed offer includes an associated purchase price of the product.

110. The computer readable medium of claim 109, further encoded with instructions to:
  credit a manufacturer's account with a payment amount based on the purchase price upon receiving the acceptance of the offer from the player.

111. The computer readable medium of claim 109, further encoded with instructions to:
  initiate a transfer of funds to a manufacturer's account, wherein an amount of funds transferred is based on the purchase price.

112. The computer readable medium of claim 109, wherein the displayed offer is selected so that the purchase price associated with the displayed offer is not greater than the amount of monetary payout.

113. The computer readable medium of claim 109, further encoded with instructions to:
  determine that the purchase price of the product is greater than the amount of monetary payout; and
  adjust a monetary balance associated with the player by a difference between the purchase price and the amount of monetary payout.

114. The computer readable medium of claim 113, wherein the code identifies a denomination requirement of the gaming device.

115. The computer readable medium of claim 113, wherein the offer is a first offer if the code is a first predetermined code and is a second offer if the code is a second predetermined code.

116. The computer readable medium of claim 115, wherein the offer is a first offer if the code identifies a first denomination requirement and is a second offer if the code identifies a second denomination requirement.

117. The computer readable medium of claim 116, wherein the player characteristic data includes a player status number.

118. The computer readable medium of claim 108, further encoded with instructions to:
  receive a purchase confirmation from the player.

119. The computer readable medium of claim 118, wherein the confirming message includes a name of the player.

120. The computer readable medium of claim 119, wherein the instructions to send purchase information to a dispatching function comprise instructions to:
  send a player address and purchase information to a dispatching function for shipping the product to the player.

121. The computer readable medium of claim 108, further encoded with instructions to:
  display a confirming message to the player.

122. The computer readable medium of claim 108, further encoded with instructions to:
  send purchase information to a dispatching function.

123. The computer readable medium of claim 108, further encoded with instructions to:
  select the offer based on a code associated with the gaming device.

124. The computer readable medium of claim 108, wherein the displayed offer is selected based on the amount of monetary payout.

125. The computer readable medium of claim 108, wherein the instructions to display an offer comprise instructions to:
  display an offer for a product based on whether output data of a gaming device meets established criteria.

126. The computer readable medium of claim 108, wherein the displayed offer is selected based on player characteristic data associated with the player.

127. The computer readable medium of claim 126, wherein the player status number is input to the gaming device by insertion of the player's card into a card reader of the gaming device.

128. The computer readable medium of claim 126, wherein the player status number identifies a frequent player.

129. The computer readable medium of claim 108, further encoded with instructions to:
  store in memory the displayed offer.

130. The computer readable medium of claim 120, further encoded with instructions to:
  store in memory the acceptance.

131. The computer readable medium of claim 130, wherein the instructions to display an offer comprise instructions to:
  display a predetermined offer if the gaming device has been continuously played by the player for a predetermined amount of time.

132. The computer readable medium of claim 131, further encoded with instructions to:
  provide a benefit to the player if the player has agreed to accept offers.

133. The computer readable medium of claim 131, wherein the instructions to determine comprise instructions to:
  determine that a player has disabled a product offer function at the gaming device.

134. The computer readable medium of claim 133, wherein the benefit comprises free games at the gaming device.

135. The computer readable medium of claim 133, wherein the benefit comprises higher payouts.

136. The computer readable medium of claim 135, wherein the gaming device comprises a slot machine and the benefit comprises free slot pulls.

137. The computer readable medium of claim 108, further encoded with instructions to:
  determine whether the player has agreed to accept displayed offers for products.

138. A computer readable medium encoded with instructions for directing a processor to:
  detect a player win that requires an amount of monetary payout;

display an offer to a player, and an associated amount that will be credited to a monetary balance associated with a player upon acceptance of the offer, in response to the player win;

receive a player acceptance of the offer; and credit the balance by the associated amount.

139. The computer readable medium of claim 138, further encoded with instructions to:

receive an offer acceptance confirmation from the player.

140. The computer readable medium of claim 138, further encoded with instructions to:

display a confirming message to the player.

141. The computer readable medium of claim 138, wherein the confirming message includes a name of the player.

142. The computer readable medium of claim 138, further encoded with instructions to:

debit a manufacturer's account by the associated amount upon receiving the player acceptance of the offer.

143. The computer readable medium of claim 138, further encoded with instructions to:

select the offer based on a code associated with a gaming device.

144. The computer readable medium of claim 143, wherein the offer is a first offer if the code is a first predetermined code and is a second offer if the code is a second predetermined code.

145. The computer readable medium of claim 143, wherein the offer is a first offer if the code identifies a first denomination requirement and is a second offer if the code identifies a second denomination requirement.

146. The computer readable medium of claim 143, wherein the code identifies a denomination requirement of the gaming device.

147. The computer readable medium of claim 146, wherein the player characteristic data includes a player status number.

148. The computer readable medium of claim 147, wherein the player status number is input to a gaming device by insertion of the player's card into a card reader of the gaming device.

149. The computer readable medium of claim 147, wherein the player status number identifies a frequent player.

150. The computer readable medium of claim 138, wherein the displayed offer is selected based on player characteristic data associated with the player.

151. The computer readable medium of claim 138, wherein the displayed offer is selected based on the amount of monetary payout.

152. The computer readable medium of claim 138, further encoded with instructions to:

store in memory the displayed offer.

153. The computer readable medium of claim 152, further encoded with instructions to:

store in memory the acceptance.

154. The computer readable medium of claim 138, wherein the instructions to display an offer comprise instructions to:

display an offer for a product based on whether output data of a gaming device meets established criteria.

155. The computer readable medium of claim 154, wherein the instructions to display an offer comprise instructions to:

display a predetermined offer if the gaming device has been continuously played by the player for a predetermined amount of time.

156. The computer readable medium of claim 138, further encoded with instructions to:

bill the associated amount to the player if the player reneges on the acceptance of the offer.

157. A computer readable medium encoded with instructions for directing a processor to:

detect a player win that requires an amount of monetary payout;

determine an offer for a product to display to a player associated with the monetary payout, based on player characteristic data and a code associated with the gaming device, wherein a purchase price associated with the offer is not greater than the amount of monetary payout;

display the offer to the player;

receive an acceptance of the offer from the player, thereby receiving an indication of a purchase;

send an indication of the purchase to a dispatching function; and output the amount of the win, less the purchase price of the product, to the player.

158. A computer readable medium encoded with instructions for directing a processor to:

detect a player win that requires an amount of monetary payout;

determine an offer for an amount of additional monetary payout in exchange for a player's agreement to switch service providers, based on player characteristic data and a code associated with the gaming device at which the win was detected;

display the offer to the player, including the amount of additional monetary payout to the player;

receive an acceptance of the offer from the player;

store the acceptance of the offer; and credit the amount of additional monetary payout to a monetary balance associated with the player.

159. A method for controlling a gaming device, comprising the steps of:

detecting a player win that requires an amount of monetary payout;

displaying an offer for a product to a player in response to the player win, wherein said displayed offer is selected based on player characteristic data associated with the player, said player characteristic data including a player status number identifying a frequent player;

receiving an acceptance of the offer from the player; and outputting the amount of the win, less the purchase price of the product, to the player.

160. A method for controlling a gaming device, comprising the steps of:

detecting a player win that requires an amount of monetary payout;

displaying an offer for a product to a player in response to the player win, the offer displayed based on whether output data of a gaming device meets established criteria, the displaying step further comprising the substep of displaying a predetermined offer if the gaming device has been continuously played by the player for a predetermined amount of time;

receiving an acceptance of the offer from the player; and outputting the amount of the win, less the purchase price of the product, to the player.

161. A method for controlling a gaming device, comprising the steps of:

detecting a player win that requires an amount of monetary payout;

displaying an offer for a product to a player in response to the player win;

receiving an acceptance of the offer from the player;

outputting the amount of the win, less the purchase price of the product, to the player;

determining whether the player has agreed to accept displayed offers for products; and providing a benefit to the player if the player has agreed to accept offers, wherein the benefit comprises higher payouts.

162. A method for controlling a gaming device, comprising the steps of:

detecting a player win that requires an amount of monetary payout;

displaying an offer for a product to a player in response to the player win;

receiving an acceptance of the offer from the player;

outputting the amount of the win, less the purchase price of the product, to the player;

determining whether the player has agreed to accept displayed offers for products; and providing a benefit to the player if the player has agreed to accept offers, wherein the benefit comprises free games at the gaming device.

163. The method of claim 162, wherein the gaming device comprises a slot machine and the benefit comprises free slot pulls.

* * * * *